United States Patent [19]
Libert et al.

[11] Patent Number: 5,791,038
[45] Date of Patent: Aug. 11, 1998

[54] METHOD OF SEPARATING STATOR LAMINATIONS

[76] Inventors: Thomas M. Libert, 1320 Outward Ave., DePere, Wis. 54115; Keith J. Krause, 2845 Pickeral Rd., Brussels, Wis. 54204; Daniel A. Labs, 1280 Elm St., Green Bay, Wis. 54302

[21] Appl. No.: 548,708
[22] Filed: Oct. 26, 1995
[51] Int. Cl.$^6$ .................................................. H02K 15/02
[52] U.S. Cl. ........................... 29/596; 29/254; 29/426.3; 29/426.5; 29/609; 29/732; 29/762; 156/344; 156/584; 414/787; 414/795.4
[58] Field of Search ............................ 29/596, 598, 609, 29/732, 762, 426.3, 426.4, 426.5, 254; 156/344, 584; 414/787, 795.4

[56] References Cited

U.S. PATENT DOCUMENTS 5,537,731 7/1996 Sassi ........................................ 29/598

*Primary Examiner*—Carl E. Hall
*Attorney, Agent, or Firm*—Donald Cayen

[57] ABSTRACT

A motor stator delaminator separates individual electrical laminations from a stack thereof. A stack is transferred from an infeed conveyor at a loading station onto an elevator. The elevator raises the stack inside a tower to a holding station. At the holding station, support for the stack is transferred from the elevator to a holding mechanism. The elevator descends to the loading station. A breaker plate extends into the interior of the tower between the holding station and the loading station. The stack is released by the holding mechanism to fall by gravity onto the breaker plate. That action separates the individual laminations. A door opens a discharge opening in the tower, and an eject mechanism pushes the individual laminations through the discharge opening and out of the tower.

11 Claims, 4 Drawing Sheets

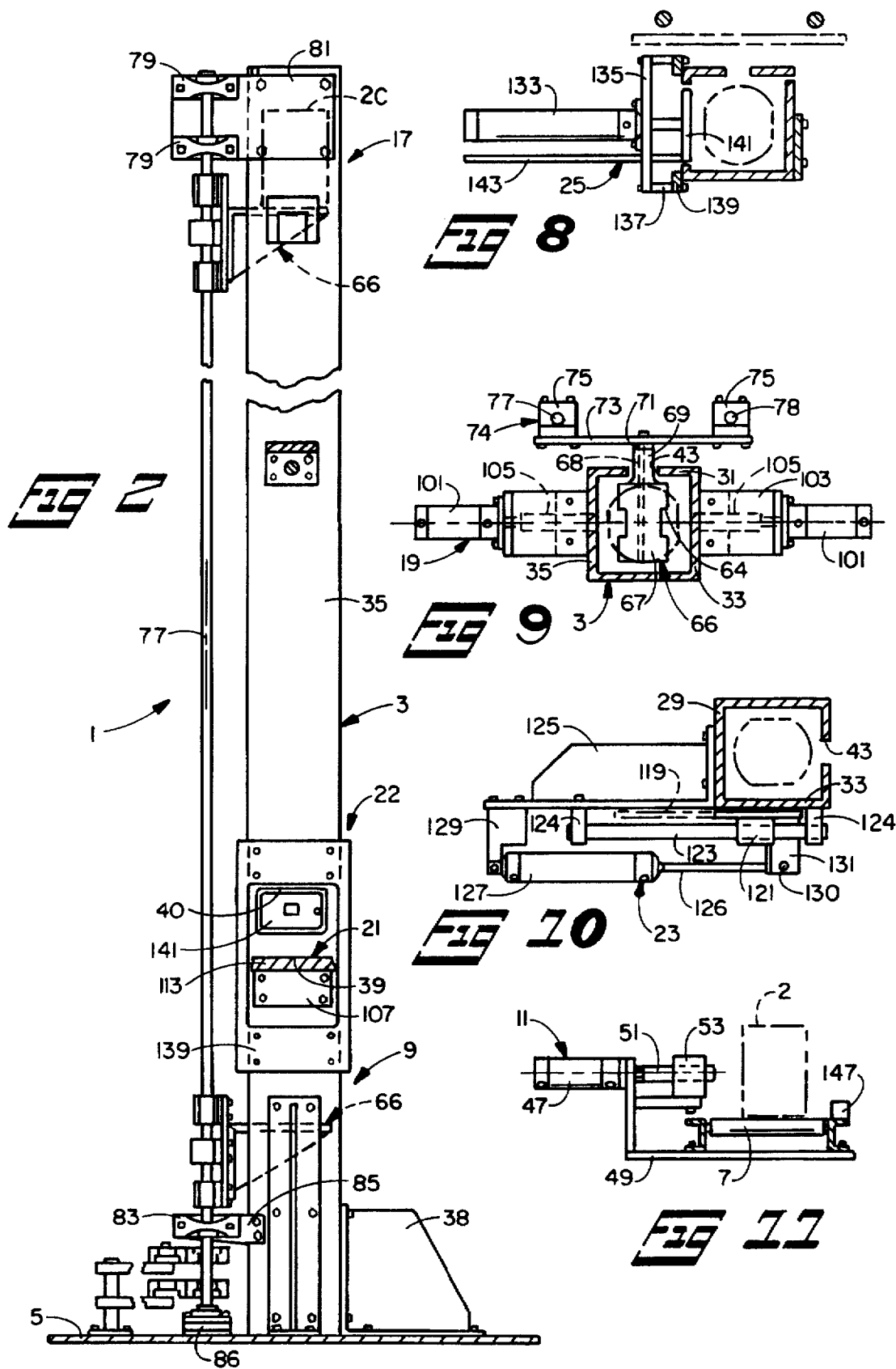

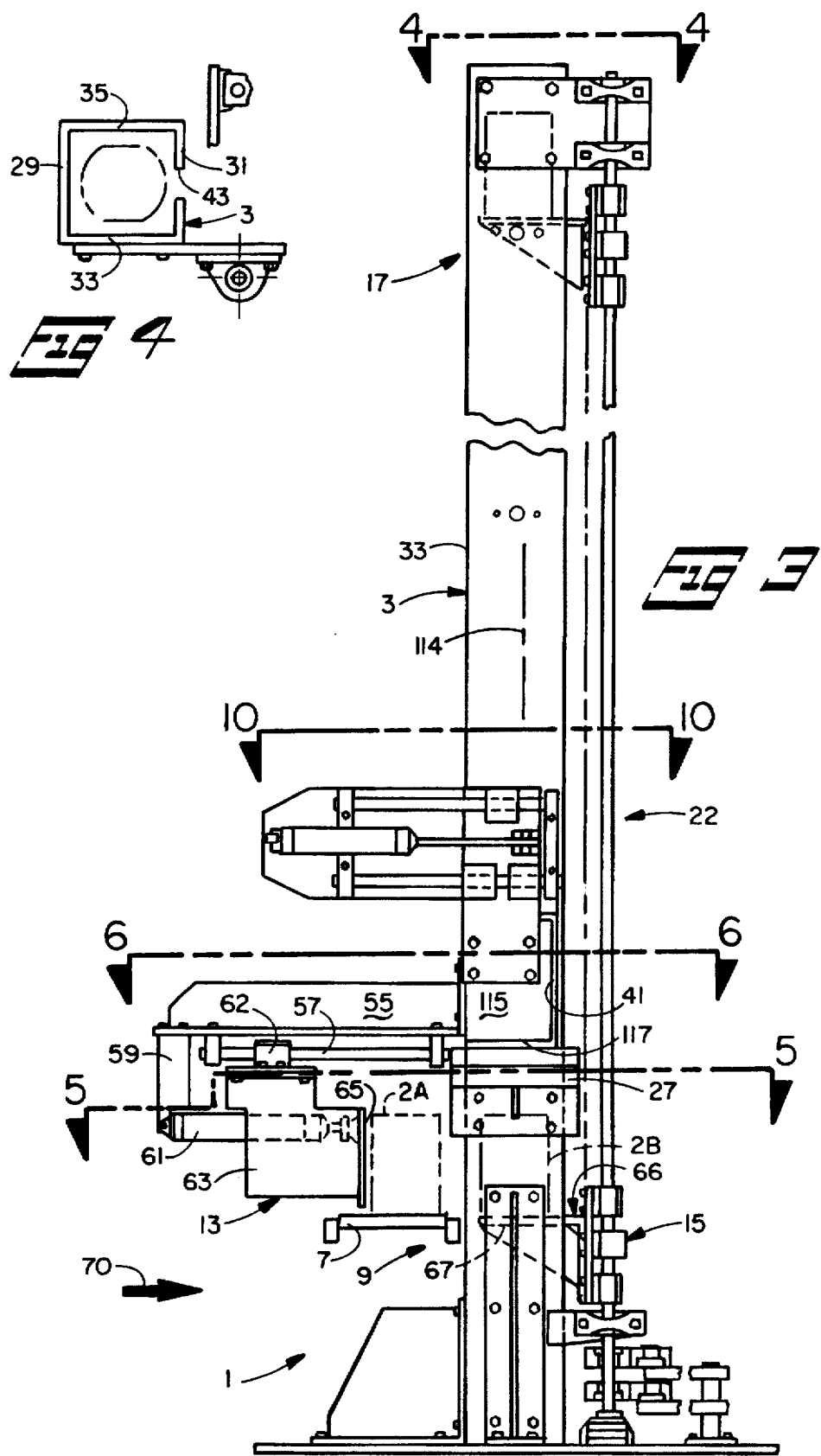

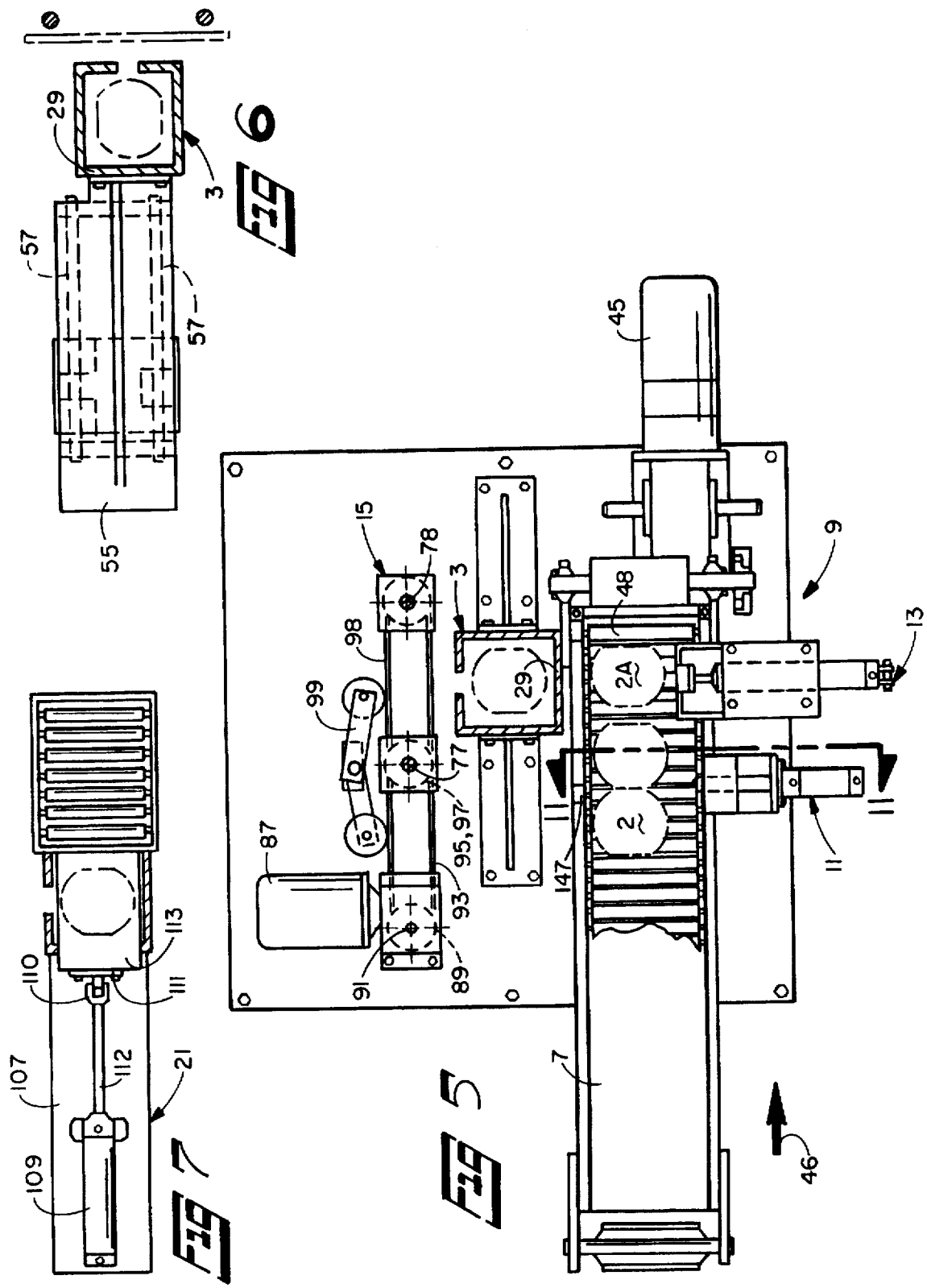

METHOD OF SEPARATING STATOR LAMINATIONS

BACKGROUND OF THE INVENTION

1. Field of the Invention

This invention pertains to workpiece handling, and more particularly to apparatus and methods for separating individual pieces from a stack thereof.

2. Description of the Prior Art

Stator laminations are integral parts of electric motors and generators. The process of manufacturing the laminations includes stamping them from sheets of ferrous metal material. Normally, several sheets are stacked one on another such that several laminations are produced with each stroke of a stamping press. After being stamped, the laminations in the stack are banded together and heat treated. Then the laminations are separated from the stack for assembly into the motors and generators.

The step of separating the individual laminations from a heat treated stack presents a major problem, because the laminations are very difficult to separate from each other. One reason for the resistance to separation is that burrs are formed on the laminations during the stamping operation. The burrs interlock the laminations to each other. Another cause is that the lubricant used in the stamping operation causes the laminations to stick together.

To separate the individual laminations from a stack, a common prior practice was to manually pound them with a hammer. That practice, in addition to being inefficient, resulted in numerous injuries to the workmen and attendant workmen's compensation claims. Another prior way of separating the laminations was to pry them apart with an air hammer. That, too, was highly unsatisfactory from both productivity and worker safety standpoints. Further, the prior separating methods resulted in bending or otherwise deforming many laminations. The damaged laminations were unsuitable for use and had to be scrapped.

Thus, a need exists for an improved way to process electrical laminations.

SUMMARY OF THE INVENTION

In accordance with the present invention, a motor stator delaminator is provided that efficiently and safely separates individual motor and generator laminations from a stack thereof. This is accomplished by apparatus that includes an elevator that raises the stack to a height, and a holding mechanism that drops the stack onto a breaker plate.

The elevator includes an elevator bracket that travels between a loading station near the base of a tall tower and a holding station near the top of the tower. An infeed conveyor supplies stacks of laminations to the loading station. At the loading station, an insertion mechanism transfers the stacks from the infeed conveyor onto the elevator bracket.

The holding mechanism is mounted to the tower at the holding station. The holding mechanism selectively functions between a support mode and a release mode. When in the support mode, the holding mechanism transfers support of the stack of laminations from the elevator bracket to the holding mechanism. When in the release mode, the holding mechanism releases the stack such that it falls by gravity along a vertical path down the tower.

The breaker plate is supported in the tower between the loading and holding stations. Preferably, the breaker plate lies at a slight angle to the horizontal. The breaker plate is operated between two locations. When in a retracted location, the breaker plate is out of the tower interior and of the path of the stack of laminations as the stack falls from the holding mechanism. When in an extended location, the breaker plate is in the interior of the tower and lies in the path of the stack of laminations when the stack is released by the holding mechanism to fall down the tower.

The motor stator delaminator further comprises a discharge station located in general horizontal alignment with the breaker plate. At the discharge station, a door mechanism operates to selectively open and close a discharge opening in the tower wall. An eject mechanism at the discharge station translates forwardly and backwardly into and out of the tower interior, respectively, in directions parallel to the plane of the breaker plate. When translated in the forward direction, the eject mechanism pushes the stack of laminations from the breaker plate onto a discharge conveyor.

In operation, the elevator bracket is initially at the loading station. The breaker plate is in its retracted location, and the door mechanism closes the discharge opening in the tower wall. The eject mechanism is translated backwardly out of the tower interior. The holding mechanism is in its release mode.

The infeed conveyor propels stacks of laminations in a downstream direction toward the loading station. A clamp mechanism and appropriate sensors at the loading station, in cooperation with suitable logic circuitry, properly place one stack at a time at the loading station. The insertion mechanism transfers the stack onto the elevator bracket. The elevator bracket travels to the holding station. The holding mechanism then functions to its support mode whereat it extends under part of the stack on the elevator bracket. The elevator bracket travels back to the loading station, but the stack remains at the top of the tower, supported by the holding mechanism.

When the elevator bracket is again at the loading station, the breaker plate operates to extend into the tower interior. Then the holding mechanism functions to its release mode. Doing so causes the stack to fall by gravity and strike the breaker plate. That action separates the laminations from each other, but the individual laminations remain in a loose vertical stack on the breaker plate, guided by the tower walls. The door mechanism opens the discharge opening in the tower wall. The eject mechanism translates forwardly to push the laminations out the tower discharge opening and onto the discharge conveyor. The breaker plate then operates to its retracted location, the door mechanism closes the tower discharge opening, the eject mechanism translates backwardly, and the cycle repeats.

The method and apparatus of the invention, using an elevator, holding mechanism, and breaker plate, thus separates individual motor and generator laminations from each other in an efficient and safe manner. The prior practice of manually separating the laminations with its low productivity and high risk of injury to workmen is eliminated.

Other advantages, benefits, and features of the present invention will become apparent to those skilled in the art upon reading the detailed description of the invention.

BRIEF DESCRIPTION OF THE DRAWINGS

FIG. 2 a view taken along line 2—2 of FIG. 1 showing part of the left side of the motor stator delaminator of the invention.

FIG. 3 is a view showing part of the right side of the motor stator delaminator of the invention.

3

Figure 1:
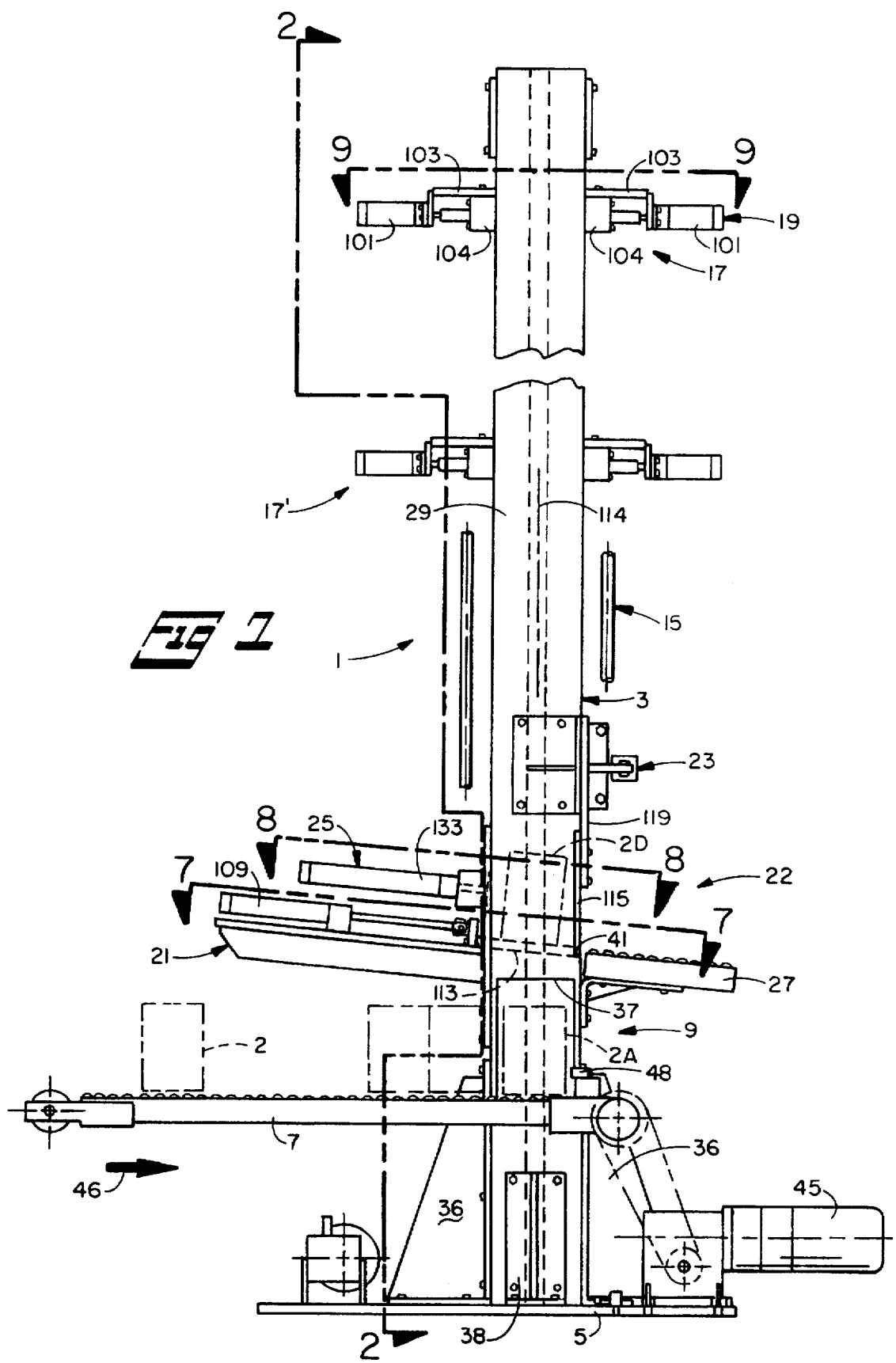
FIG. 1 is a front view showing a part of the motor stator delaminator of the present invention.

FIG. 4 a partial view on a slightly enlarged scale taken along line 4—4 for FIG. 3.

FIG. 5 is a cross sectional view on a slightly enlarged scale taken along line 5—5 of FIG. 3.

FIG. 6 is a cross sectional view on a slightly enlarged scale taken along line 6—6 of FIG. 3.

FIG. 7 is a cross sectional view on a slightly enlarged scale taken along line 7—7 of FIG. 1.

FIG. 8 is a cross sectional view on a slightly enlarged scale taken along line 8—8 of FIG. 1.

FIG. 9 is a cross sectional view on a slightly enlarged scale taken along line 9—9 of FIG. 1.

FIG. 10 is a cross sectional view on a slightly enlarged scale taken along line 10—10 of FIG. 3.

FIG. 11 is a partial cross sectional view taken along line 11—11 of FIG. 5 and rotated 90 degrees clockwise.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

General

Referring to FIGS. 1-3, a motor stator delaminator 1 is illustrated that includes the present invention. The motor stator delaminator 1 is particularly useful for separating stacks 2 of electric motor and generator laminations into the individual laminations. However, it will be understood that the invention is not limited to electrically related applications.

The motor stator delaminator 1 is comprised of a tall tower 3 secured to a base 5. An infeed conveyor 7 propels the stacks 2 of laminations to a loading station 9. At the loading station 9, an insertion mechanism 13 transfers a stack 2A from the infeed conveyor onto an elevator 15 to a position indicated by reference numeral 2B.

The elevator 15 includes an elevator bracket 66 that travels between the loading station 9 and a holding station 17 near the top of the tower. A holding mechanism 19 functions to support the stack, represented by reference numeral 2C, at the holding station 17 when the elevator bracket 66 travels back to the loading station 9.

A breaker mechanism 21 operates to selectively extend into and retract from the interior of the tower 3 above the loading station 9. When the breaker mechanism 21 is extended, the holding mechanism 19 releases the stack 2C, which falls by gravity onto the breaker mechanism to the position 2D. The impact of the stack on the breaker mechanism causes the individual laminations to separate from each other.

At a discharge station 22 of the motor stator delaminator 1 is a door mechanism 23. The door mechanism 23 selectively closes and opens a discharge opening 41 in the tower wall. After the door mechanism 23 opens the discharge opening 41, an eject mechanism 25 translates forwardly to push the individual laminations, still arranged in the stack 2D, onto a discharge conveyor 27.

Tower

Looking also at FIG. 4, the tower 3 is comprised of a front wall 29, a back wall 31, a right side wall 33, and a left side wall 35. The four walls, 29, 31, 33, and 35 are arranged in a generally rectangular shape. Although the tower can have different heights and cross sectional areas depending on the particular laminations that are to be treated by the invention, we have found that a tower having a height of about 12 feet and being approximately 9 inches on a side works very well for many different size lamination stacks 2. The tower walls are secured to the base 5 by gusset brackets 36 and 38.

The tower front wall 29 has a loading opening 37 at the loading station 9. The height of the loading opening 37 is sufficient to enable stacks 2A of laminations to pass through it. The tower left wall 35 has a horizontally orientated slot 39 through it above the loading station 9. The left wall also has an opening 40 above the slot 39. The slot and opening 40 are in general horizontal alignment with the discharge opening 41 in the tower right wall 33. The bottom of the discharge opening 41 opening 41 is located approximately one inch lower than the bottom of the slot 39. The height of the discharge opening 41 is approximately the same as the height of the loading opening 37.

A heavy stiffening plate 139 is joined to the left wall 35 and straddles the slot 39 and opening 40. The back wall 31 has a slot 43 that extends for the full height of the tower 3.

Infeed Conveyor

The infeed conveyor 7 is generally horizontal. It is powered by a conventional electric motor and gear drive 45. The infeed conveyor propels stacks 2 of laminations in a downstream direction 46 to the loading station 9.

To assure proper placement of the stacks 2A at the loading station, a clamp mechanism 11 controls the final movement of the stacks to the loading station. Looking especially at FIGS. 5 and 11, the clamp mechanism 11 comprises an actuator 47, which, in the preferred embodiment, is a horizontally oriented fluid clamp cylinder. The clamp cylinder 47 is mounted by a bracket 49 to the infeed conveyor 7. A pin 51 is connected to the rod of the clamp cylinder 47. The pin 51 is guided for horizontal reciprocation in a guide 53 that is part of the bracket 49.

When the clamp cylinder 47 and pin 51 are retracted, the stacks 2 are free to be propelled in the downstream direction 46 (FIG. 1) by the infeed conveyor 7. However, when the cylinder and pin are extended, the pin blocks the path of the stacks. A stack sensor, typically represented at reference numeral 147, which can be a photoelectric, proximity, or other well-known sensor, detects the absence or presence of the leading edge of a stack 2 as it approaches the clamp mechanism 11.

Loading Station

At the loading station 9, a stack 2A of laminations is transferred from the infeed conveyor 7 to elevator 15. A conveyor sensor, not shown, detects whether a stack 2A is in proper placement on the conveyor for the transfer. To positively limit the travel of the stack 2A in the downstream direction 46, a stop 48 extends across the infeed conveyor downstream of the loading station.

Transfer of the stack 2A from the infeed conveyor 7 to the elevator 15 is performed by the insertion mechanism 13. The insertion mechanism includes a heavy bracket 55 attached to the front wall 29 of the tower 3. Also see FIGS. 3 and 6. The bracket 55 supports a pair of horizontal rods 57 and a bar 59. The casing of an actuator, which may be a fluid insertion cylinder 61, is connected to the bar 59. The piston rod of the insertion cylinder 61 is connected to an insertion carriage 63 that rides on the rods 57 by means of linear bearings 62. A front face 65 of the insertion carriage 63 is covered with a soft but tough protective coating such as an ultra high molecular weight polyurethane plastic material.

When the insertion cylinder 61 and the insertion carriage 63 are in a withdrawn position as shown in FIG. 3, the infeed conveyor 7 can propel a stack 2A of laminations to the loading station 9. Actuation of the insertion cylinder 61 in the direction of arrow 70 advances the insertion carriage to push the stack 2A from off the infeed conveyor and onto the elevator bracket 66. The stack of laminations on the elevator bracket at the loading station is represented by reference numeral 2B.

Elevator

The elevator 15 raises a stack 2B of laminations from the loading station 9 to the holding station 17. The stack of laminations at the holding station is represented by reference numeral 2C.

In the preferred embodiment and as best shown in FIGS. 2, 5, and 9, the elevator is comprised of the elevator bracket 66, which has an H-shaped platform 67 with cutouts 64. The platform 67 and a gusset 68 are located primarily inside the tower 3. The platform has a neck section 69 that extends through the slot 43 in the tower back wall 31. The elevator bracket further comprises a vertical plate 71 that is joined to the platform neck section 69 and the gusset 68. The elevator bracket is fastened to a elevator mounting plate 73 by means of the vertical plate 71.

The elevator mounting plate 73 is part of an elevator drive system generally represented by reference numeral 74. In the illustrated construction, the elevator drive system 74 also includes a pair of linear actuators 75, known in the art, such as those manufactured by the Rohlix Company of The linear actuators 75 are mounted to the elevator mounting plate 73, and they co-act with respective vertical lift shafts 77, 78. Each lift shaft 77, 78 is journaled at its top end by a pair of pillow blocks 79 that are attached to respective bearing plates 81. In turn, the bearing plates 81 are secured to the tower right and left walls 33 and 35, respectively. The elevator lift shafts are journaled at their bottom ends by associated pillow locks 83. The pillow blocks 83 are attached to respective plates 85 that are secured to the tower right and left walls. The linear shafts are supported vertically by associated flange bearings 86 secured to the base 5.

To operate the elevator 15, a conventional electric motor and gear box 87 are employed. A first drive pulley 89 is mounted on the output shaft 91 of the motor and gear box 87. A first belt 93 meshes with the first drive pulley 89 and with a first driven pulley 95 on the lift shaft 77. A second drive pulley 97 on the lift shaft 77 drives a second belt 98 that meshes with a second driven pulley on the linear shaft 78. In that manner, operation of the motor and gear box 87 causes the two linear shafts to rotate in unison and in the same direction. The direction of rotation of the motor and gear box 87 determines the direction of lift shaft rotation and thus the direction of travel of the elevator bracket 66 within the tower 3. The tension on the belts 93 and 98 is adjustable by a belt tensioner 99.

Holding Mechanism

To support the stack 2C of laminations at the holding station 17, the holding mechanism 19 is used. In the particular construction illustrated in the FIGS. 1, 2, and 9, the holding mechanism is comprised of a pair of horizontally oriented fluid holding cylinders 101. Each holding cylinder 101 is mounted to a respective holding bracket 103. A pair of blocks 104 are fastened to the tower 3, one to the right wall 33 and one to the left wall 35. The holding brackets 103 are fastened to the blocks 104. To the piston rod of each holding cylinder 101 is connected an associated holding pin 105. The holding pins 105 are guided in suitable bores in the blocks 104 and pass through aligned holes in the tower right and left walls.

When the holding cylinders 101 are in a release mode, the holding pins 105 are outside of the tower interior. When the holding cylinders are in a support mode, the pins extend inside the tower interior and are aligned with the cutouts 64 in the elevator bracket platform 67.

Breaker Mechanism

The breaker mechanism 21 is located a short distance above the loading station 9. Looking at FIGS. 1, 2, and 7, the breaker mechanism is composed of a sturdy breaker bracket 107 fastened to the tower left wall 35. A fluid breaker cylinder 109 is mounted to the breaker bracket 107. A clevis 110 on the breaker cylinder piston 112 connects to a T-shaped bracket 111 that in turn is attached a breaker plate 113.

The breaker mechanism 21 operates to a retracted location whereat the breaker plate 113 is outside of the interior of the tower 3, and to an extended location whereat the breaker plate is in the tower interior. In the extended location, the breaker plate passes through and is supported by the slot 39 in the tower left wall 35. The breaker plate is also supported by the lower edge of the discharge opening 41 in the tower right wall 33.

It is a feature of the present invention that the plane of the breaker plate 113 is not perpendicular to the longitudinal axis 114 of the tower 3. Rather, the plane of the breaker plate makes an angle of approximately 85 degrees with the tower axis 114.

Discharge Station

At the discharge station 22, the stack of laminations, represented by reference numeral 2D, to be explained shortly, is discharged from the tower 3. For that purpose, the door mechanism 23 selectively opens and closes the discharge opening 41 in the tower right wall 33. Looking especially at FIGS. 1, 3, and 10, the door mechanism comprises a door 115 having a lower end 117 that is spaced a short distance above the plane of the top surface of the breaker plate 113. The door 115 is fastened to a door mounting plate 119. The door mounting plate 119 includes two or more linear bearings 121 that ride on horizontal shafts 123. The shafts 123 are supported on one end on the tower right wall by a mounting block 124. The other ends of the horizontal shafts are supported by another mounting block 124 on a large L-shaped bracket 125. The L-shaped bracket 125 is mounted to the tower front wall 29.

To open and close the door 115, a linear actuator in the form of a fluid door cylinder 127 is employed. One end of the door cylinder 127 is anchored to the bracket 125 by a block 129. The piston rod 126 of the door cylinder is connected to the door mounting plate 119 through a pin 130 and a pair of blocks 131. Actuation of the door cylinder 127 reciprocates the door plate 119, and thus the door 117, along the shafts 123 to open and close the tower discharge opening 41.

The discharge station 22 further comprises the eject mechanism 25, FIGS. 1, 2, and 8. The eject mechanism is located close to and above the breaker mechanism 21. The eject mechanism is comprised of a fluid eject cylinder 133 that is mounted on its rod end to a plate 135. The plate 135 in turn is mounted by a pair of blocks 137 to the stiffening plate 139. The axial centerline of the eject cylinder 133 is parallel to the plane of the breaker plate 113.

Connected to the piston rod of the eject cylinder 133 is a pusher 141. A long guide rod 143 screwed into the pusher 141 passes through a guide hole in the plate 135. The eject cylinder and the pusher are horizontally aligned with the opening 40 in the tower left wall 35 and with the discharge opening 41 in the tower right wall 33. Actuation of the eject cylinder causes the pusher to translate forwardly and backwardly into and out of, respectively, the interior of the tower 3. Translation of the pusher is parallel to the plane of the breaker plate 113.

The discharge conveyor 27 is mounted to the tower right wall 33 under the discharge opening 41. The plane of the top surfaces of the rollers of the discharge conveyor is generally in line with the top surface of the breaker plate 113.

Operation

The motor stator delaminator 1 operates in a cyclical fashion to completely process one stack 2 of laminations before another stack is processed. The infeed conveyor 7 is loaded with a number of stacks 2. The conveyor drive motor 45 operates the infeed conveyor to propel the stacks in the downstream direction 46 toward the loading station 9.

At the start of a cycle, the clamp cylinder 47, insertion cylinder 61, holding cylinders 101, breaker cylinder 109, and eject cylinder 133 are all in their respective retracted positions. The door cylinder 127 is in its extended position such that the door 115 closes the discharge opening 41 in the tower right wall 33. All the cylinders are controlled by appropriate fluid and electric logic circuits. The elevator bracket 66 is located at the loading station 9 in response to operation of sensors and circuitry that control the elevator motor and gear box 87.

The sensor 147 in cooperation with the control circuit logic permits one stack 2A to pass the clamp mechanism 11. Upon sensing the leading edge of the following stack after a stack 2A has passed the clamp mechanism, the sensor 147 causes the clamp cylinder 47 to actuate and extend the pin 51 across the infeed conveyor 7 and into the path of the stacks 2.

When a sensor detects the leading edge of the stack 2A at the loading station 9, the control circuit stops operation of the motor 45 and thus stops the infeed conveyor. Then the insertion cylinder 61 actuates to push the stack 2A with the carriage front face 65 and transfer the stack 2A from the infeed conveyor 7 onto the platform 67 of the elevator bracket 66. A stack thus is at the position indicated by reference numeral 2B in FIG. 3. A proper location of the stack 2B is verified by a suitable sensor. The insertion cylinder then actuates to withdraw the insertion carriage 63 from over the infeed conveyor.

The control logic of the motor stator delaminator 1 actuates the motor and gear box 87 of the elevator 15 to raise the stack 2B to the holding station 17. Proper arrival of the stack, indicated by reference numeral 2C, is detected by a suitable sensor. At that point, the holding cylinders 101 function to extend their respective holding pins 105. The pins enter the cutouts 64 in the elevator bracket 67 under opposite sides of the stack 2C. Then the motor and gear box 87 operate to lower the elevator bracket 66 back to the loading station 9. Support of the stack 2C is thus transferred from the elevator bracket to the holding pins.

When the elevator bracket 66 is back at the loading station 9, the breaker cylinder 109 actuates to extend the breaker plate 113 through the interior of the tower 3. In that position, the breaker plate is supported by the slot 39 and discharge opening 41 in the tower left and right walls 35 and 33, respectively.

The holding cylinders 101 then function to retract their respective pins 105. Doing so releases support for the stack 2C, and the stack falls by gravity along a vertical path onto the breaker plate 113. That action causes the individual laminations in the stack to separate from each other but without distorting or otherwise damaging the individual laminations in any way. The oblique angle of approximately 85 degrees of the breaker plate to the direction of stack fall greatly enhances the separation of the individual laminations from the stack. The interior of the tower 3 is designed such that the individual laminations remain in a loose stack, represented by reference numeral 2D.

Next, the door cylinder 127 actuates to retract and thereby slide the door 115 to open the discharge opening 41 in the tower right wall 33. With the door open, the eject cylinder 133 actuates to translate the pusher 141 forwardly into the tower interior and into contact with the stack 2D. Continued extension of the eject cylinder causes the pusher to push the stack 2D from off the breaker plate 113 and onto the discharge conveyor 27. From the discharge conveyor, the stack 2D is propelled in a downstream direction for further processing.

The door cylinder 127 then extends to close the discharge opening 41. The breaker cylinder 109, eject cylinder 133, and holding cylinders 101 retract the breaker plate 113, pusher 141, and holding pins 105, respectively, from the tower interior. The clamp cylinder 47 retracts the pin 51 from over the infeed conveyor 7 to allow another stack 2A to reach the loading station 9. The motor stator delaminator 1 is then ready to process the next stack 2.

In some situations, it may be desirable to drop a stack more than one time onto the breaker plate 113. In those instances, the door 115 remains closed after the first drop. The eject cylinder 133 remains retracted. The elevator 15 operates to raise the elevator bracket 66 such that the platform 67 thereof is just below the breaker plate 113. The breaker cylinder 109 retracts, and the stack 2D falls a short distance onto the elevator bracket. Then the elevator raises the stack 2D to the holding station 17 for another drop.

To further increase the versatility of the present invention, it may include more than one holding station. As best shown in FIG. 1, one or more additional holding stations 17' can be incorporated into the tower 3. The height of the additional holding stations 17' above the breaker plate 113 are chosen to suit different types and sizes of lamination stacks 2. The logic circuitry can be programmed both as to the particular holding station from which a stack is dropped as well as the number of drops.

In summary, the results and advantages of motor and generator stator laminations can now be more fully realized. The motor stator delaminator 1 provides both an efficient and a safe way to separate stacks of lamination into the individual laminations. This desirable result comes from using the combined functions of the elevator 15 and the breaker mechanism 21. The elevator raises stacks of laminations, which are loaded onto the elevator by the insertion mechanism 13 acting in conjunction with the infeed conveyor 7 and the clamp mechanism 11, to the holding station 17. The holding mechanism 19 temporally supports the stack until the elevator bracket 66 has lowered below the breaker plate 113 and the breaker plate has extended into the interior of the tower 3. Then the stack is dropped onto the breaker plate. The door mechanism 23 and eject mechanism 25 cooperate to push the dropped stack from the breaker plate onto the discharge conveyor 27. The motor stator delaminator can be constructed and programmed to vary both the height from which a stack is dropped, and the number of times a stack is dropped.

It will also be recognized that in addition to the superior performance of the present invention, its construction is such as to be of modest cost in relation to the benefits it provides. The increase in productivity and decrease in worker injuries that result from using the motor stator delaminator 1 easily justify its capital expenditure. Also, because the design and operation of the motor stator delaminator are simple, and because it is made from rugged components, its need for maintenance is minimal.

Thus, it is apparent that there has been provided, in accordance with the invention, a motor stator delaminator that fully satisfies the aims and advantages set forth above. While the invention has been described in conjunction with specific embodiments thereof, it is evident that many alternatives, modifications, and variations as to sizes, shapes, and materials will be apparent to those skilled in the art in light of the foregoing description. Accordingly, it is intended to embrace all such alternatives, modifications, and variations as fall within the spirit and broad scope of the appended claims.

We claim:

1. A method of separating individual electrical laminations from a stack thereof in which the laminations are initially interlocked with and stuck to each other comprising the steps of:
   a. raising the stack of laminations to a predetermined height above a breaker plate;
   b. dropping the stack of laminations from the predetermined height onto the breaker plate; and
   c. separating the individual laminations from each other without distortion or damage in response to the stack striking the breaker plate.

2. A method of separating individual electrical laminations from a stack thereof in which the laminations are initially interlocked with and stuck to each other comprising the steps of:
   a. raising the stack of laminations to a predetermined height above a breaker plate, wherein the step of raising the stack of laminations to a predetermined height comprises the steps of:
      i. providing holding pins at the predetermined height above the breaker plate;
      ii. supporting the stack on an elevator bracket;
      iii. raising the elevator bracket to the predeterming height; and
      iv. transferring support of the stack from the elevator bracket to the holding pins;
   b. dropping the stack of laminations from the predetermined height onto the breaker plate; and
   c. separating the individual laminations from each other without distortion or damage in response to the stack striking the breaker plate.

3. The method of claim 2 wherein the step of dropping the stack of laminations comprises the step of releasing the stack of laminations from the holding pins, so that the stack of laminations falls by gravity onto the breaker plate.

4. The method of claim 1 wherein:
   a. the step of raising the stack of laminations comprises the step of raising the stack of laminations inside a tower; and
   b. the step of dropping the stack of laminations onto the breaker plate comprises the steps of:
      i. dropping the stack of laminations in a generally vertical direction onto a breaker plate inside the tower; and
      ii. discharging the stack of laminations in a generally horizontal direction from the breaker plate through a tower wall to the outside of the tower.

5. A method of separating individual electrical laminations from a stack thereof in which the laminations are initially interlocked with and stuck to each other comprising the steps of:
   a. raising the stack of laminations to a predetermined height above a breaker plate;
   b. dropping the stack of laminations from the predetermined height onto the breaker plate, wherein the step of dropping the stack of laminations onto the breaker plate comprises the steps of:
      i. dropping the stack of laminations to fall vertically; and
      ii. orientating the breaker plate to make an angle of approximately 85 degrees with the vertical, so that the stack of laminations strikes the breaker plate at an oblique angle to the direction of fall; and
   c. separating the individual laminations from each other without distortion or damage in response to the stack striking the breaker plate.

6. A method of separating electrical laminations from a stack thereof comprising the steps of:
   a. supporting a stack of laminations on an elevator bracket;
   b. raising the elevator bracket to a predetermined height;
   c. transferring support of the stack of laminations from the elevator bracket to a holding mechanism;
   d. lowering the elevator bracket to a loading station;
   e. extending a breaker plate under the holding mechanism;
   f. releasing the holding mechanism; and
   g. dropping the stack of laminations onto the breaker plate.

7. The method of claim 6 wherein the step of dropping the stack of laminations comprises the step of dropping the stack of laminations to fall inside the interior of a tower.

8. The method of claim 6 comprising the further step of transferring the stack of laminations from a conveyor onto the elevator bracket at a loading station.

9. The method of claim 7 comprising the further step of discharging the stack of laminations from the breaker plate to outside of the tower.

10. The method of claim 9 wherein in the step of discharging the stack of laminations comprises the steps of:
    a. opening a door in the tower; and
    b. pushing the stack of laminations from off the breaker plate and through the door in the tower.

11. The method of claim 6 wherein:
    a. the step of dropping the stack of laminations comprises the step of dropping the stack of laminations to fall along a vertical path; and
    b. the step of extending a breaker plate under the holding mechanism comprises the step of extending a breaker plate at an oblique angle to the vertical path, so that the stack of laminations strikes the breaker plate at the oblique angle.

* * * * *